US012767594B2

United States Patent

Bedard et al.

(12) United States Patent
(10) Patent No.: US 12,767,594 B2
(45) Date of Patent: Oct. 20, 2026

(54) METAL TREATMENTS FOR FIBER SUBSTRATES, PROCESSES FOR TREATING FIBER SUBSTRATES, AND FILTER MEDIA HAVING TREATED FIBER SUBSTRATES

(71) Applicant: UOP LLC, Des Plaines, IL (US)

(72) Inventors: Robert L. Bedard, McHenry, IL (US); F. Stephen Lupton, Evanston, IL (US); David N. Myers, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 451 days.

(21) Appl. No.: 18/062,770

(22) Filed: Dec. 7, 2022

(65) Prior Publication Data

US 2023/0212068 A1 Jul. 6, 2023

Related U.S. Application Data

(60) Provisional application No. 63/266,208, filed on Dec. 30, 2021.

(51) Int. Cl.
*C03C 25/605* (2018.01)
*B01D 39/20* (2006.01)
(Continued)

(52) U.S. Cl.
CPC ........ *C03C 25/605* (2013.01); *B01D 39/2017* (2013.01); *C03C 25/64* (2013.01);
(Continued)

(58) Field of Classification Search
None
See application file for complete search history.

(56) References Cited

U.S. PATENT DOCUMENTS

| | | | |
|---|---|---|---|
| 5,840,245 | A | 11/1998 | Coombs et al. |
| 7,513,933 | B2 | 4/2009 | Coppom et al. |

(Continued)

FOREIGN PATENT DOCUMENTS

| | | | |
|---|---|---|---|
| CN | 106245423 | A | 12/2016 |
| CN | 107376509 | A | 11/2017 |

(Continued)

OTHER PUBLICATIONS

CN111495038A_ENG (Espacenet machine translation of Li) (Year: 2020).*

(Continued)

*Primary Examiner* — Gabriel E Gitman

(57) ABSTRACT

Processes for increasing an affinity of a filter media to airborne viral particles. A fiber substrate comprising borosilicate is provided. The fiber substrate may comprise acidic functional groups. A metal salt solution is introduced to the fiber substrate to form a treated substrate. The metal salt solution includes divalent and/or trivalent metal cations. The pH of the metal salt solution is adjusted, and a divalent and/or trivalent metal cation is exchanged with a proton from the acidic functional groups. The metal may be present in an amount ranging from about 0.001 to about 3.0 wt. % of the treated fiber substrate. The treated fiber substrate is incorporated into a filter media before or after the deposition of the metal onto the fiber substrate.

16 Claims, 3 Drawing Sheets

(51) Int. Cl.

| | |
|---|---|
| ***C03C 25/64*** | (2006.01) |
| ***C03C 25/66*** | (2006.01) |
| *C03C 25/007* | (2018.01) |

(52) U.S. Cl.

CPC ...... *C03C 25/66* (2013.01); *B01D 2239/0442* (2013.01); *B01D 2239/0492* (2013.01); *B01D 2239/10* (2013.01); *C03C 25/007* (2013.01)

(56) References Cited

U.S. PATENT DOCUMENTS

| | | | | |
|---|---|---|---|---|
| 9,107,970 | B2 | 8/2015 | Morein et al. | |
| 2006/0281119 | A1* | 12/2006 | Chan | C12Q 1/6816 435/6.19 |
| 2010/0298110 | A1* | 11/2010 | Richter | C03C 13/00 65/472 |
| 2013/0199234 | A1 | 8/2013 | Kim et al. | |
| 2015/0273451 | A1* | 10/2015 | Ravishankar | C10G 47/02 585/350 |
| 2019/0242064 | A1* | 8/2019 | Dankovich | C09D 5/00 |
| 2021/0282482 | A1* | 9/2021 | Tian | A41D 31/02 |
| 2022/0032240 | A1* | 2/2022 | Fokema | B01D 71/024 |
| 2022/0040354 | A1 | 2/2022 | Magee | |

FOREIGN PATENT DOCUMENTS

| | | | | | |
|---|---|---|---|---|---|
| CN | 109173436 | A | | 1/2019 | |
| CN | 109293248 | | * | 2/2019 | G03B 37/022 |
| CN | 109603853 | B | | 4/2019 | |
| CN | 111495038 | A | * | 8/2020 | B01D 46/0038 |
| CN | 112546857 | A | | 3/2021 | |
| EP | 1044935 | A1 | | 10/2000 | |
| GB | 2016432 | A | * | 9/1979 | |
| GB | 2016632 | A | | 9/1979 | |
| JP | 50095596 | | | 7/1975 | |
| JP | 06079116 | A | | 3/1994 | |
| WO | 9207801 | | | 5/1992 | |
| WO | 2020009836 | A1 | | 1/2020 | |
| WO | 2022047483 | A1 | | 3/2022 | |

OTHER PUBLICATIONS

CN109293248A_ENG (Espacenet machine translation of Qiu) (Year: 2019).*

D.A. Lundgren et al., Effect of Particle Electrostatic Charge on Filtration by Fibrous Filters, I&EC Process Design and Development, vol. 4, Oct. 1965.

M. Pan et al., Collection, particle sizing and detection of airborne viruses, Journal of Applied Microbiology 127, 1596-1611, 2019.

Yongxiang Wang et al., Comparison of effects of particle charging, media characteristics, humidity and aerosols on loading performance of electret media, Building and Environment 179 (2020) 106962.

Chun Han et al., The charging characteristics of particle-particle contact, Journal of Electrostatics, 112 (2021) 103582.

Gongming Tu et al., Relationship between particle charge and electrostatic enhancement of filter performance, Powder Technology 301 (2016) 665-673.

Guy G. Goyer et al., Filtration of Monodisperse Electrically Charged Aerosols, Department of Chemistry, Columbia University, New York, 1953,.

International Search Report from corresponding PCT application No. PCT/US2022/082407, mailed May 5, 2023.

Written Opinion from corresponding PCT application No. PCT/US2022/082407, mailed May 5, 2023.

Extended European Search Report from corresponding European application No. 22917504.7 dated Nov. 19, 2025.

* cited by examiner

METAL TREATMENTS FOR FIBER SUBSTRATES, PROCESSES FOR TREATING FIBER SUBSTRATES, AND FILTER MEDIA HAVING TREATED FIBER SUBSTRATES

RELATED APPLICATIONS

This application claims priority to U.S. Provisional Patent Application Ser. No. 63/266,208 filed on Dec. 30, 2021, the entirety of which is incorporated herein by reference.

FIELD OF THE INVENTION

This invention relates generally to treatments on glass fibers, and more particularly to such treatments that impart increased activity at capturing airborne virus particles compared to the surface of a fiberglass filter substrate, as well as a method of applying such treatments.

BACKGROUND OF THE INVENTION

The Coronavirus, known as "COVID-19", has created a global pandemic resulting in enormous numbers of stricken persons requiring hospitalization and, in many cases, resulting in death of the stricken person. Accordingly, the unforeseen pandemic has highlighted the need for physical or chemical agents that are capable of capturing, deactivating or destroying viruses like the Covid-19 virus.

Coronaviruses are a group of viruses that usually cause mild illnesses, such as the common cold. However, certain types of coronavirus can infect the lower airway, causing serious illnesses like pneumonia or bronchitis. Most people get infected with coronaviruses at some point in their lives and the majority of these infections are harmless. The new coronavirus that causes the covid-19 illness is a notable exception.

Coronaviruses have extraordinarily large single-stranded RNA genomes—approximately 26,000 to 32,000 bases or RNA "letters" in length. Coronavirus particles are surrounded by a fatty outer layer called an envelope and usually appear spherical, as seen under an electron microscope, with a crown or "corona" of club-shaped spikes on their surface.

Accordingly, the unforeseen pandemic has highlighted the result need for physical or chemical agents that are capable of capturing, deactivating or destroying viruses like the COVID-19 virus.

High-Efficiency Particulate Air (HEPA) filtration and Ultra-Low Particulate Air (ULPA) filtration may be used to remove airborne virus particles from the air. The ULPA standard requires removal of 99.9995% of particles down to 1.2 micrometers. Both HEPA and ULPA filters consist of innumerable tiny strands of randomly arranged glass microfibers, typically alkali borosilicate glass compositions for HEPA and low boron compositions for ULPA in cleanroom applications.

Fiberglass wet-laid media is found in high-pressure hydraulic filtration because the glass fibers are non-compressible and provide excellent dirt-holding capacity. Fiberglass fiber can be made quite fine, even sub-micron in diameter, and is the material of choice for HEPA filters for clean rooms, coalescing media, hospital and other health care air filtration, and certain laboratory filters.

Although existing glass HEPA filter media is known to effectively remove airborne virus particles, it is difficult to incorporate the metal ions into fiberglass substrates without negatively effecting the particle removal properties.

Metal ions, in particular, antiviral metal ions are usually deposited in glass via ion exchange, often in molten salt media, followed by a high temperature heat treatment to initiate solid state ion exchange and diffusion of the active metal ion into the glass. The resulting glass articles are typically used for anti-viral glass surfaces for touchpads, laptop computers, and smart phone screens, however this process is not compatible with manufacture of micro-glass fibers used in air filtration.

Accordingly, there remains a need for effective and efficient processes for treating fiber-based substrates, such as fiberglass, to increase the affinity of the fiber for airborne virus particles.

SUMMARY

The present invention provides new methods for treating fiber substrates, such as fiberglass filter media, to create a surface with an increased affinity for airborne virus particles. The present processes treat the surface of a fiber substrate to increase an amount of divalent and trivalent metals on the surface of the fibers in the substrate. The fibers may be subjected to an acid leaching step to produce acidic ion exchange sites. This acid leaching step can be omitted if desired in more chemically reactive glasses with designed biosolubility characteristics, and in some cases in more conventional glass compositions with higher levels of alkali in the composition such as in B-, or C-glass microfibers. The acidic ionic exchange sites of the fiber substrate are then exchanged by immersion, spraying, or soaking in a neutral or mildly alkaline salt solution of the containing cations of divalent and trivalent metals. This ion exchange process can be advantageously accomplished in the wet end of a filtration media paper machine in a mixing tank prior to the headbox, in the headbox shortly before wet laying on a moving forming fabric, or subsequent to wet-laying before, during, or after the addition of binder resins to the formed media and prior to drying. This would ensure that the metal ions are present in the ionic form at the very surface that contacts the airborne viral particles during use.

Therefore, the present invention may be characterized, in at least one aspect, as providing a process for treating a fiber substrate by: providing the fiber substrate, wherein the fiber substrate comprises fiberglass; introducing the fiber substrate to a salt solution, wherein the salt solution comprises divalent metal cations, trivalent metal cations, or a combination thereof; depositing the metal cations onto the fiber substrate; and drying the fiber substrate, after the metal cations have been deposited, wherein the divalent and trivalent metal cations are selected from a group consisting of: $Mn^{2+}$, $Co^{2+}$, $Co^{3+}$, $Ga^{3+}$, $Al^{3+}$, $Mg^{2+}$, $Ca^{2+}$, $Sr^{2+}$, $Ba^{2+}$, $La^{3+}$, $Bi^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$.

The divalent and trivalent metal cations may be selected from a group consisting of: $Mn^{2+}$, $Co^{2+}$, $Co^{3+}$, $Ga^{3+}$, $Al^{3+}$, $Mg^{2+}$, $Ca^{2+}$, $Sr^{2+}$, and $Ba^{2+}$.

The divalent and trivalent metal cations may be deposited by ion exchange. The ion exchange may occur with a proton on the fiber substrate. The ion exchange may occur with a monovalent metal cation on the fiber substrate.

The divalent and trivalent metal cations may be deposited by entangling in the fiber substrate.

The process may further include increasing an amount of SiOH species on the glass fibers. The amount of SiOH may be increased by an acid leaching. The acid leaching may occur before introducing the fiber substrate to the salt solution. The acid leaching may occur simultaneously with introducing the fiber substrate to the salt solution.

The amount of the divalent and trivalent metal cations on the fiber substrate may be increased is at least 0.001 wt % of the fiber substrate.

The amount of the divalent and trivalent metal cations on the fiber substrate may be at least 0.005 wt % of the fiber substrate.

The amount of the divalent and trivalent metal cations on the fiber substrate may be between 0.001 and 3.0 wt % of the fiber substrate.

In another aspect, the present invention may be generally characterized as providing a filter media substrate that includes fiberglass that has been treated to increase an amount of divalent cations, trivalent cations, or both at least 0.001 wt % and in which the divalent and trivalent metal cations are selected from a group consisting of: Mn2+, Co2+, Co3+, Ga3+, Al3+, Mg2+, Ca2+, Sr2+, Ba2+, Bi3+, La3+, Ce3+, Pr3+, Nd3+, Pm3+, Sm3+, Eu3+, Gd3+, Tb3+, Dy3+, Ho3+, Er3+, Tm3+, Yb3+, Lu3+.

The divalent and trivalent metal cations may be selected from a group consisting of: Mn2+, Co2+, Co3+, Ga3+, Al3+, Mg2+, Ca2+, Sr2+, and Ba2+.

The divalent and trivalent metal cations may be between about 0.005 and about 3.0 wt. % of the filter media substrate.

The divalent and trivalent metal cations may be between 0.01 and 3.0 wt. % of the filter media substrate.

The divalent and trivalent metal cations may be between 0.05 and 3.0 wt. % of the filter media substrate.

The divalent and trivalent metal cations may be between 0.1 and 3.0 wt. % of the filter media substrate.

The divalent and trivalent metal cations may be between 0.15 and 3.0 wt. % of the filter media substrate.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures.

DETAILED DESCRIPTION OF THE INVENTION

As mentioned above, the present processes deposit divalent and/or trivalent metal cations onto a fiber substrate. The fiber of the fiber substrate includes acidic ionic exchange sites that have had the proton of the acid exchanged with a divalent or trivalent metal cation, or the monovalent cations exchanged with the divalent or trivalent metal cations. This treatment may be placed on hydrophilic and hydrophobic substrates (filters, cloths, other surfaces of interest). Compared with an untreated surface, the treated surface is believed to have increased affinity for removing airborne virus particles.

The name of the virus responsible for the 2019-2020 pandemic is severe acute respiratory syndrome coronavirus 2, or SARS-CoV-2. The name of the disease caused by SARS-CoV-2 is COVID-19, which stands for "coronavirus disease 2019. Often the terms for the virus and the name of the disease are used interchangeably. For purposes of this application, "the coronavirus pandemic" and similar expressions can be used where it is understood that "coronavirus" is short for "coronavirus disease" (and specifically COVID-19).

SARS-CoV-2 is a large, enveloped virus. The lipid envelope of which is particularly sensitive to biocides. For purposes of this application, "antiviral" means a material that kills "the virus responsible for COVID-19" or "the COVID-19 virus."

This application provides a novel approach for depositing metals onto various substrates, especially fiberglass, that can be integrated into existing filter technologies, especially high efficiency and HEPA filters. Anti-viral HEPA filters are predicted to play an important role in ensuring the safety of employees, customers, and students as they return to indoor environments. Importantly, the technology or process resulting from this invention is amenable with existing fiber and papermaking technologies and can readily be scaled-up to meet the demands of manufacturers. The process can be used to deposit a wide variety of metals and is anticipated to easily integrate into existing wet-laid media-manufacturing processes.

With these general principles in mind, one or more embodiments of the present invention will be described with the understanding that the following description is not intended to be limiting.

Figure 1:
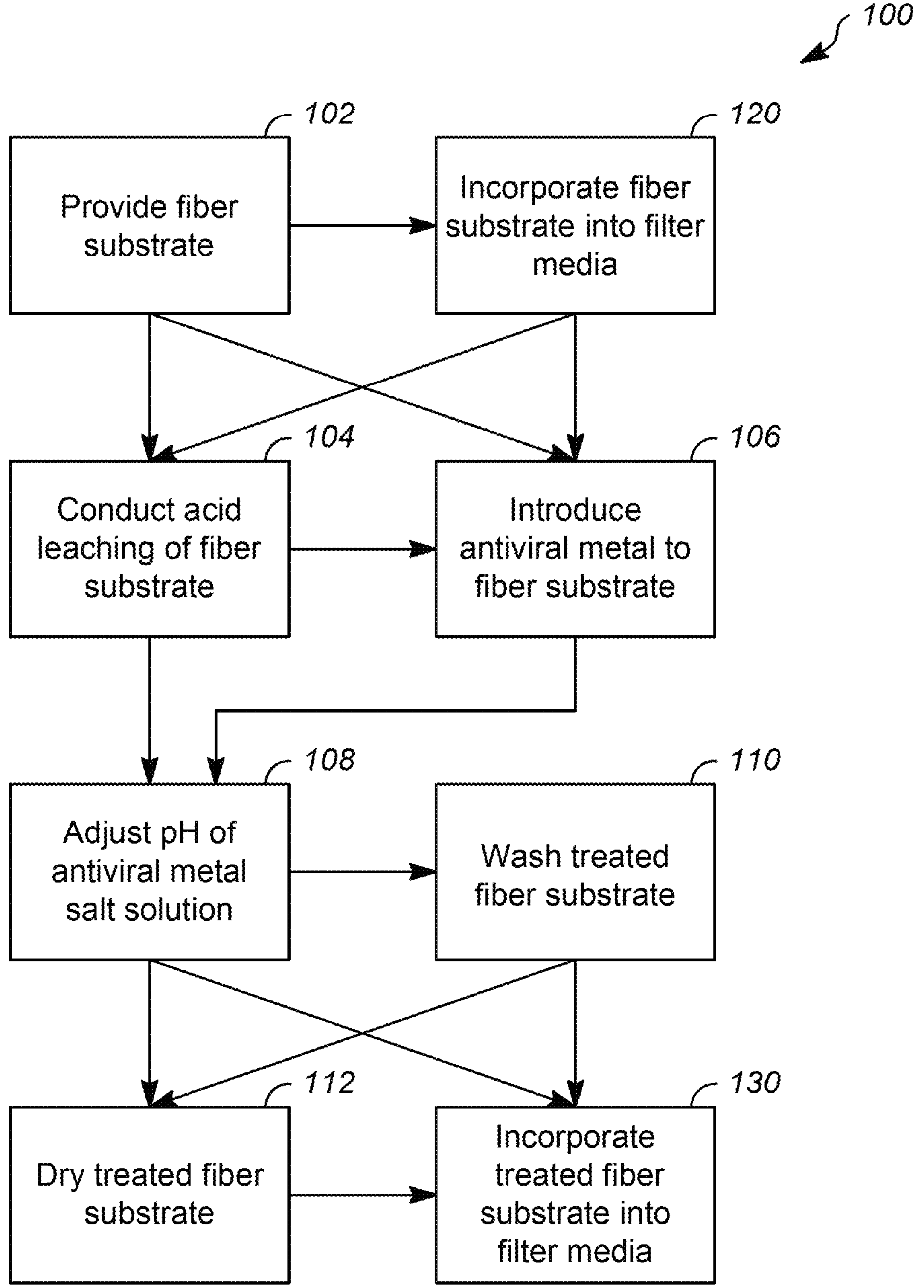
FIG. 1 shows a treatment process according to an embodiment of the present invention.

As shown in FIG. 1, the present process 100 include six main steps: providing a fiber substrate 102; acid leaching the fiber substrate 104; introducing a metal salt solution 106; adjusting the pH of the metal salt solution 108; optionally decanting or filtering, washing the treated substrate 110; and drying the substrate 112.

The steps of incorporating the fibers substrate into the filter media 120 and incorporating the treater fiber substrate into filter media 130 are also shown.

These steps will be described below, with the understanding that terms like "first," "second," "third," and "fourth" do not imply a specific order and that one should not be inferred unless expressly stated.

Fiber Substrate

In the first step 102 in the present process 100, the fiber substrate is provided. The fiber substrate includes a fiber typically used in filter media such a fiberglass. In a particular embodiment, the fiber substrate is a borosilicate glass.

The fibers 10 may be any type of fiber typically used in filter media such a fiberglass. For example, the fiber substrate may be A-glass fiber, B-glass fiber, C-glass fiber, D-glass fiber, E-glass fiber, ECR glass fiber, T-glass fiber, S2-glass fiber, M-glass fiber, and mixtures thereof. a bio-soluble glass such as a low $Al_2O_3$ glass with high $B_2O_3$, and either a high $Na_2O+K_2O$ content or high CaO+MgO content.

For example, the fiber substrate may be an A-glass, a B-glass, a C-glass, or a biosoluble glass such as a low $Al_2O_3$ glass with high $B_2O_3$, and either a high $Na_2O+K_2O$ content or high CaO+MgO content. In a preferred embodiment, the fiber substrate is a B- or C-glass borosilicate or a bio-soluble microglass glass such as Johns Manville 253, 475, 481, or 902 glass. C-04-F and B-04-F glass microfibers are manufactured by Unifrax Specialty Fibers and JM 481 is manufactured by Johns Manville.

C-04-F comprises approximately 63.0-67.0 $SiO_2$; 4.0-7.0 $B_2O_3$; 14.0-17.0 $Na_2O$; and 3.0-5.0 $Al_2O_3$. B-04-F comprises approximately 55.0-60.0 $SiO_2$; 8.0-11.0 $B_2O_3$; 9.5-

13.5 $Na_2O$; and 4.0-7.0 $Al_2O_3$. JM 481 glass microfibers comprise approximately 60.8 wt. % $SiO_2$; 11.4 wt. % $B_2O_3$; 9.1 $Na_2O$; and 2.0 $Al_2O_3$.

The fiber substrate may be provided in a dry form, in suspension, or otherwise dispersed in a liquid medium.

Acid Leaching

In the second step 104, an optional acid leaching is performed. The glass microfibers may first be treated with an acid in an acid leaching step. This step may be useful for fiber substrate with an initially low hydrophilicity since the acid treatment increases the hydrophilicity substantially by generating SiOH species on the glass surface. In the illustrated embodiment, nitric acid is used to exchange alkali and alkaline earth cations of the fiber substrate with protons as well as leaching some of the $B_2O_3$ and $Al_2O_3$ oxides out of the glass. Both processes generate acidic SiOH species on the glass surface.

In the illustrated embodiment, nitric acid is used to exchange cations of the fiber substrate with protons. However, in other embodiments any strong acid could be used, including hydrohalic acids such as HF or HCl, or carboxylic acids such as acetic acid. The acid leaching step, if used, can be carried out in a stirred tank just prior to the headbox of the paper machine followed by decanting the leachate and re-suspending the glass fibers in water prior to pumping the fiber furnish to the headbox. In some cases, decanting/reslurrying may not be necessary if an acidic paper furnish is desired for wet-laying.

Introducing Divalent/Trivalent Metal Ions

Turning to the third step 106, in the present process 100, the fiber substrate is introduced to a solution containing divalent and/or trivalent metal cations.

A metal salt solution is prepared. In the illustrated embodiments, the metal salts include cations that are divalent or trivalent cations. Exemplary metal cations include Cu2+, Ag2+, Zn2+, Fe2+, Fe3+, Ni2+, Sn2+, Mn2+, Co2+, Co3+, Ga3+, Bi3+, Al3+, Mg2+, Ca2+, Sr2+, Ba2+, La3+, Ce3+, Pr3+, Nd3+, Pm3+, Sm3+, Eu3+, Gd3+, Tb3+, Dy3+, Ho3+, Er3+, Tm3+, Yb3+, Lu3+. The cations in the solution may be from salts, such as nitrates, acetate, chlorides, or sulfate salts which disassociate in an appropriate solvent (water).

While some of the metals have been reported to have antiviral property, it is thought that increasing the amount of divalent and/or trivalent metal cations on the fiber increase the affinity for airborne particles. Accordingly, the salt solution may have a mixture of metal cations, including at least one first cation selected from Cu2+, Ag2+, Zn2+, Bi3+, Fe2+, Fe3+, Ni2+, Sn2+, and at least one second cation selected from Mn2+, Co2+, Co3+, Ga3+, Al3+, Mg2+, Ca2+, Sr2+, Ba2+, La3+, Ce3+, Pr3+, Nd3+, Pm3+, Sm3+, Eu3+, Gd3+, Tb3+, Dy3+, Ho3+, Er3+, Tm3+, Yb3+, Lu3+. It is contemplated that the at least one second cation is selected from Mg2+, Ca2+, Sr2+, Ba2+. In some embodiments, one salt solution containing both the first cation and second cation may be provided, and in other embodiments, a first solution containing one of the first or second cations may be used, and then a second solution with the other of the first or second cations may be used.

Additionally, it is contemplated that first fibers are introduced to the first cation and that second fibers are introduced to the second cation. The two types of fibers (each treated with a different cation) may be mixed, in equal or unequal parts, to from a filter media. Thus, the filter media has fibers with an increased amount of the first cation and fibers with an increased amount of the second cation.

The substrate may be introduced to the salt solution(s) in any number of processes, such as by dipping the substrate in the metal salt solution, brushing the metal salt solution onto the substrate, or by spraying the metal salt solution onto the substrate. For example, the treatment can be accomplished by adding the metal salt solution to the paper machine headbox or upstream wet end tank at an effective time 0 to 60 minutes prior to the wet-laying the glass fiber media, followed optionally by decanting or filtering the spent solution from the treated fibers prior to sheet formation. Another possible treatment operation is the pumping or spraying of the metal ion exchange solution just after the wet-laid glass media is formed on the forming fabric, at one or more points just before, in combination with resin binder addition, or just after the resin binder is added. These processes are known in the art of papermaking.

The manner and mechanism of attachment may differ depending on the characteristics of the metal ion and the fiber substrate. For example, in some cases, the metal may bond to the fiber substrate for example by ion exchange with a proton or a monovalent cation on the surface of the fibers. In some cases, the metal ions may become entangled in fibers in the fiber substrate.

The exact process of the metal being deposited on the substrate is not important provided that the divalent or trivalent metal is secured for a commercially suitable amount of time (that may differ for different materials).

Adjusting pH of the Metal Salt Solution

As shown in FIG. 1, the fourth step 108 of the present process 100 involves adjusting the pH of the metal salt solution. It is contemplated that this occurs before, after, or during the introducing step 106.

For example, while the fiber substrate is in the metal salt solution, the pH is adjusted to maximize the deposition of the divalent and/or trivalent metal onto the fiber substrate. In the preferred embodiment, the pH is adjusted to provide a pH greater than 5.0. Preferably, the pH is adjusted between about 5.2 and about 11.5, more preferably between about 7.0 and about 11.0. In the illustrated embodiment, the pH adjustment is obtained by adding ammonium hydroxide to the solution. Other bases may be used, such as dilute sodium hydroxide.

In the suspension, the metal ions will exchange with the proton of the acidic functional groups and with residual alkali cations on the fiber substrate. After a sufficient time for the exchanging to occur, the suspension, with fiber substrate now including the divalent and/or trivalent metal ions, forms a treated fiber substrate.

Alternatively, instead of the depositing of metal ions occurring before the pH adjusting step, it is contemplated that the depositing of metal ions occurs during the pH adjusting step. For example, the substrate may be dipped into a mildly acidic solution comprising the metal ions to exchange the metal ion with the proton or residual alkali cations.

Washing

The fifth step in the present process 100 is an optional washing step 110. In the illustrated embodiments, ammonium hydroxide is used to wash the treated fiber substrate or the formed wet-laid, metal-deposited media. In other embodiments, other solvents such as purified and or deionized water may be used.

Drying

The sixth step in the present process 100 is drying the treated substrate 112. In this step, the suspension medium evaporates, leaving the treated fiber substrate and unattached metal ions to attach to the surface of the substrate and provide a dry, treated substrate.

Dewatering and drying may occur dewatering by vacuum, and or mechanical pressing which generally occur in the forming section on the forming fabric, followed by removal from the forming fabric and continued conveyance through infrared drying, hot air drying, drying on heated rollers, or other and drying unit operations known in the art. In the illustrated embodiment, drying the treated fiber substrate takes place at a temperature between about 50 and about 150 degrees Celsius.

Optionally, the washing and drying steps may be omitted. As shown in process 100 of FIG. 1, the metal deposition may be followed by incorporating the treated fiber substrate into filter media.

Papermaking

The steps of incorporating the fiber substrate into filter media 120 and incorporating the treated fiber substrate into filter media 130 of the present processes are shown in FIG. 1. It is envisioned that the metal can be deposited onto the fiber substrate to form a treated fiber substrate that is subsequently incorporated into filter media, via a wet-laid process. Also, it is envisioned that the fiber substrate is incorporated into filter media, via a wet-laid process, and subsequently the divalent and trivalent metal ions can be deposited onto the fiber substrate to form a treated fiber substrate.

Figure 2:
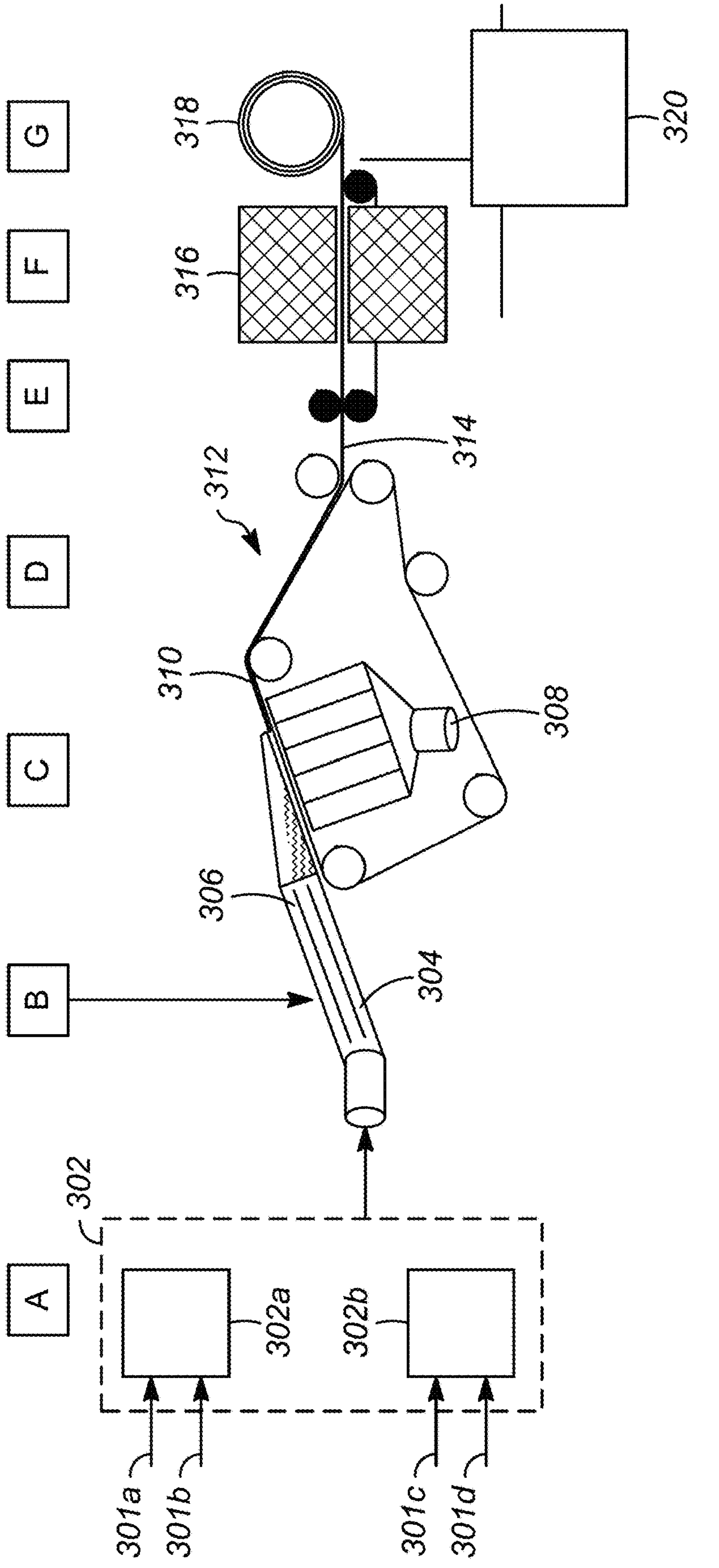
FIG. 2 shows a papermaking process according to an embodiment of the present invention.

FIG. 2 shows an embodiment of the wet-laid process 300. The wet-laid process includes A pre-headbox region A, a headbox region B, wet-laying region C, a binder region D, rolling region E, drying region F, and a post-drying region G. The pre-headbox region comprises a first pre-mix tank 302*a* and a second premix tank 302*b*.

In the pre-headbox region A, a first fiber substrate 301*a* is provided and a first divalent/trivalent metal component 301*b* is introduced to the fiber substrate. In a second pre-mix tank 302*b*, a second fiber substrate 301*c* may be introduced to a second divalent/trivalent metal component 301*d*.

The pre-headbox mixing 302 creates a fiber slurry 304. The fiber slurry is sent to the headbox 306, which is used to apply the fiber slurry to the wet-laid papermaking machine. The wet-laid papermaking machine comprises a suction box 308 to draw liquid out downward and inclined wire 310. Thereafter, binder 312 is applied to the wet-laid fiber. A nip roll press 314 compresses the web, and a dryer 316 removes excess moisture. Thereafter, a roller 318 is used to store the filter media. Post-drying treatment 320 may include further coating or treatment.

In certain contemplated embodiments, the divalent/trivalent metal cations can be introduced to the fiber substrate in the pre-headbox region A, in the headbox region B, in the wet-laying region C, in the binder region D, in the rolling region E, and in the post-drying region G.

The filter media may be formed by a traditional type of paper machine headbox called the Fourdrinier headbox. Filter media made from long synthetic fiber and difficult to disperse furnishes are produced on headboxes specially designed for this purpose. Two of the most common are the Rotoformer® headbox and the inclined wire headbox. Glens Falls Interweb (GFI) in Glens Falls, N.Y. manufactures both. The Rotoformer® forms the sheet on a wire covered rotating drum. The inclined wire headbox (known as the Delta Former®) forms the sheet on the incline of the wire as it passes through the pond.

Contemplated embodiments include the divalent/trivalent metal being introduced to the fiber substrate at various points during the paper-making process. For example, the divalent/trivalent metal can be introduced to the fiber substrate in one or more of the following unit operations of a paper-making process: a wet-end mix tank, a machine chest, a headbox or binder impregnation section of a paper machine selected from the group consisting of: Fourdrinier, twin-wire machine, Rotoformer®, Delta Former®, or other inclined-type paper machines.

Additional adjustments to the fiber slurry chemistry may be desired to improve substrate formation in the presence of the increased ionic strength of the divalent/trivalent metal deposition solution, for example by the addition of charged and/or neutral retention aids such as cationic and anionic polyacrylamide of various charge densities and molecular weight distributions, polyethyleneimine polyelectrolytes, starch, colloidal clays, alumina, and silica, and neutral polyethylene oxide with varying molecular weight distributions known in the art.

It should be appreciated that any suitable method for creating a glass fiber slurry may be used. In some cases, divalent/trivalent metal cations and any additional additives are added to the slurry to facilitate processing. The temperature and pH may also be adjusted to a suitable range. In some embodiments, the temperature and pH of the slurry are maintained. In some cases, the temperature and pH are not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range.

In some embodiments, the process then involves introducing binder into the pre-formed glass fiber web. In some embodiments, as the glass fiber web is passed along an appropriate screen or wire, different components included in the binder (e.g., soft binder, optional hard binder), which may be in the form of separate emulsions, are added to the glass fiber web using a suitable technique. The one or more divalent/trivalent metals may also be appropriately added to the glass fiber web along with the binder or independently from the binder. In some cases, each component of the binder resin is mixed as an emulsion prior to being combined with the other components and/or glass fiber web. The divalent/trivalent metals may also be provided as an emulsion prior to mixing with the binder and incorporation into the glass fiber web. In some embodiments, the components included in the binder along with the divalent/trivalent metals may be pulled through the glass fiber web using, for example, gravity and/or vacuum. In some embodiments, one or more of the components included in the binder resin and/or the divalent/trivalent metals may be diluted with softened water and pumped into the glass fiber web.

In some embodiments, the divalent/trivalent metals may be added after the binder and other components have been added. For example, the divalent/trivalent metals may be introduced into the glass fiber web in a downstream step after the binder components have already been introduced into the web. In another example, the divalent/trivalent metals may be introduced into the glass fiber web along with the binder, or wherein the one or more divalent/trivalent metals are added last in the process (e.g., before or after the drying of the fiber web).

After the binder and the divalent/trivalent metals are incorporated into the glass fiber web, the wet-laid fiber web may be appropriately dried. In some embodiments, the wet-laid fiber web may be drained. In some embodiments, the wet-laid fiber web may be passed over a series of drum dryers to dry at an appropriate temperature (e.g., about 50° C. to 150° C., or any other temperature suitable for drying). For some cases, typical drying times may vary until the moisture content of the composite fiber is as desired. In some embodiments, drying of the wet-laid fiber web may be performed using infrared heaters. In some cases, drying will aid in curing the fiber web. In addition, the dried fiber web may be appropriately reeled up for downstream filter media processing.

As an example, a filter media may be prepared by a wet laid process where a first dispersion (e.g., a pulp) containing a glass fiber slurry (e.g., glass fibers in an aqueous solvent such as water) is applied onto a wire conveyor in a papermaking machine (e.g., Fourdrinier or Rotoformer®), forming a first phase. A second dispersion (e.g., another pulp) containing another glass fiber slurry (e.g., glass fibers in an aqueous solvent such as water) is then applied onto the first phase. Vacuum is continuously applied to the first and second dispersions of fibers during the above process to remove solvent from the fibers, resulting in a filter media having a first phase and a second phase. The filter media formed is then dried. It can be appreciated that filter media may be suitably tailored not only based on the components of each glass fiber web, but also according to the effect of using multiple glass fiber webs of varying characteristics in appropriate combination. In a contemplated embodiment, one or more of the glass webs contains glass fibers which have been subjected to include additional divalent/trivalent metals.

After formation, the filter media may be further processed according to a variety of known techniques. For example, the filter media may be pleated and used in a pleated filter element. In some embodiments, filter media, or various layers thereof, may be suitably pleated by forming score lines at appropriately spaced distances apart from one another, allowing the filter media to be folded. It should be appreciated that any suitable pleating technique may be used.

It should be appreciated that the filter media may include other parts in addition to the glass fiber web. In some embodiments, the filter media may include more than one glass fiber web. In some embodiments, further processing includes incorporation of one or more structural features and/or stiffening elements. The glass fiber web(s) may be combined with additional structural features such as polymeric and/or metallic meshes. For example, a screen backing may be disposed on the filter media, providing for further stiffness. In some cases, a screen backing may aid in retaining the pleated configuration. For example, a screen backing may be an expanded metal wire or an extruded plastic mesh.

The filter media may be incorporated into a variety of suitable filter elements for use in various applications including ASHRAE filter media applications. The filter media may generally be used for any air filtration application. For example, the filter media may be used in heating and air conditioning ducts. The filter media may also be used in combination with other filters as a pre-filter, such as for example, acting as a pre-filter for high efficiency filter applications (e.g., HEPA). Filter elements may have any suitable configuration as known in the art including bag filters and panel filters.

Treated Filter Substrate

It is believed that the present processes increase the affinity of the filter media for airborne virus particles. Such a surface is believed to be beneficial in the fight against many viruses, including the Covid-19 virus.

Although existing glass HEPA filter media is known to effectively remove infectious agents such as viruses from air, it would be desirable to increase the affinity of the filter media for airborne articles. Once captured, the infectiousness of virus particles decays over time, which is several days (recently determined to be about 5 days) on glass surfaces. Existing anti-viral treatments of filtration media tend be thicker coatings, which can degrade the particle-capture characteristics, and they are usually multi-step processes not readily compatible with paper manufacturing.

Theories of filtration generally propose multiple particle capture mechanisms that include direct impact of higher momentum particles, attraction by natural forces of smaller, lower momentum particles to fiber surfaces, diffusional, or probabilistic contact of submicron particles with media fibers, and electrostatic forces, with the dominant mechanism being a function of the captured particle size and its electrostatic or surface charge. There is a particle size range that is too small for appreciable momentum effects yet too large for major contributions from diffusion effects. This size range is referred to as the most penetrating particle size (MPPS), which for HEPA media is usually in the 0.3-micron range.

Particle size distribution, for instance from aerosols created by exhaled air, coupled with additional variation of liquid or mucus content of the breathed particles, results in the captured bacteria and viruses-containing particles penetrating HEPA media to different depths as a function of the capture efficiency as described above. Prior art treatments are usually created by spraying the already manufactured HEPA media with coatings of antibacterial and antiviral species. These treatments are concentrated on one or both of the outside surfaces of the media, therefore not effectively interacting with particles that have penetrated into the media beyond the sprayed-on coating. Even antimicrobial coating of premanufactured media by dipping would not be expected to uniformly treat the entire depth of the media since interaction with the first encountered fibers would likely deposit higher quantities of antimicrobial species, thereby similarly creating a non-uniform distribution.

In certain preferred embodiments of the present disclosure, a uniform distribution of divalent/trivalent metals is created through the thickness of the HEPA media, thereby maximizing the effectiveness of the media throughout the entire range of possible microbe-containing particle size and properties.

The metal-loaded C-glass samples discussed in the examples below were characterized by scanning electron microscopy. Energy Dispersive X-Ray Spectroscopy (EDS or EDX) is a chemical microanalysis technique used in conjunction with scanning electron microscopy (SEM).

Figure 3:
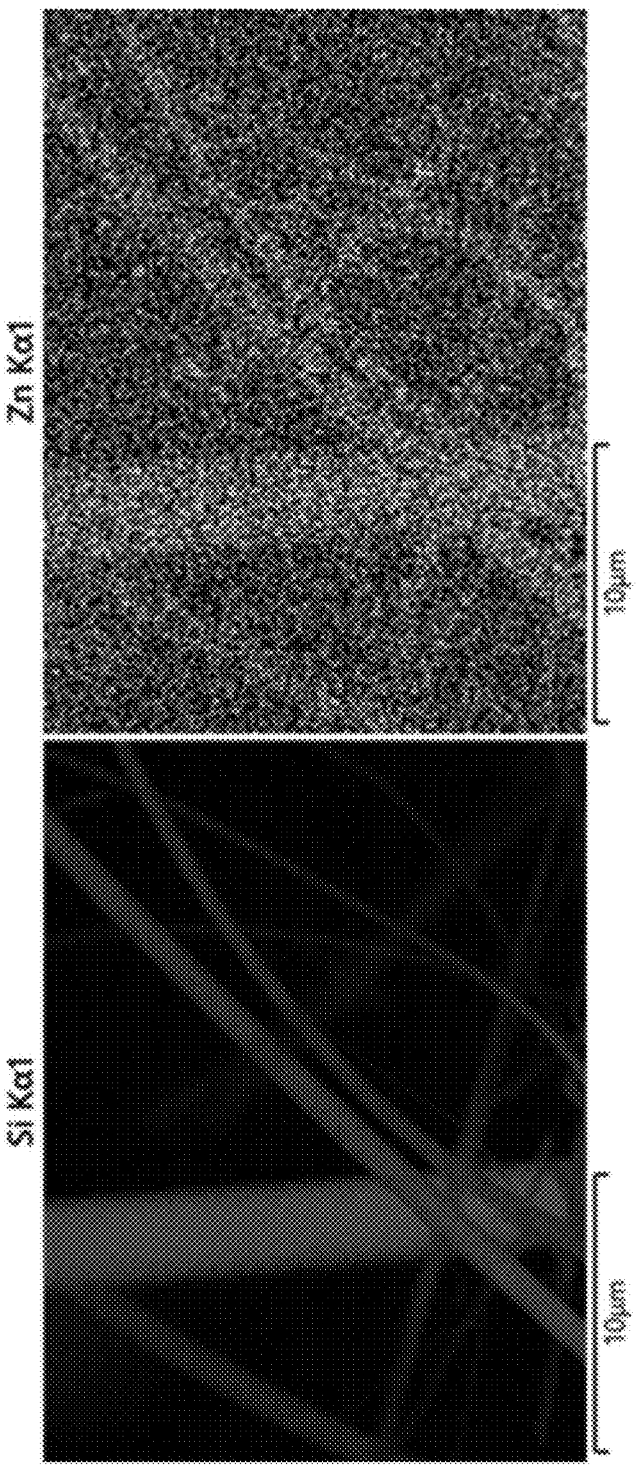
FIG. 3 is images showing glass fibers on the left and zinc deposited on the glass fibers on the right.

The well-dispersed metal treatment applied to the glass in the instant disclosure does not provide a coating or large agglomerates (e.g., nanoparticles) that would alter the filtration performance of the filter media. Further, the metal treatment of the instant application is evenly distributed such that metal species are often not detectable using SEM techniques but are preferably present in low enough quantities so as to not obscure a substantial percentage of the glass fiber surfaces. For example, as shown in FIG. 3, a glass fiber surface treated with zinc is detectable and present in an amount that does not obscure the complete surface area of the fiber.

In some embodiments, the metal treatment will be conducted to achieve various metal loading density ranges in atoms per square nanometer. The table below shows the correspondence between metal loading density (atoms/nm$^2$) to wt. % for Ag, Cu, and Zn treatments on 3.5 m$^2$/g microglass fibers.

TABLE 1

| | atoms/nm$^2$ | | |
|---|---|---|---|
| wt. % | Ag | Cu | Zn |
| 0.0001 | 0.0016 | 0.0027 | 0.0026 |
| 0.001 | 0.016 | 0.027 | 0.026 |
| 0.005 | 0.080 | 0.13 | 0.13 |
| 0.01 | 0.16 | 0.27 | 0.26 |
| 0.5 | 8 | 13 | 13 |
| 1 | 16 | 27 | 26 |
| 2.5 | 40 | 67 | 66 |
| 3.0 | 48 | 81 | 79 |

In the illustrated embodiment, the metal is present in an amount ranging from about 0.001 to about 3.0 wt. % of the fiber substrate, preferably between about 0.005 and about 2.5 wt. % of the fiber substrate.

In some embodiments, the treated fibers have a silver loading density range of about 0.016 to about 48 atoms/nm$^2$, preferably between about 0.16 and about 40 atoms/nm$^2$. The copper loading density may be in a range of between about 0.027 and about 81 atoms/nm$^2$, preferably between about 0.27 and about 67 atoms/nm$^2$. The zinc loading density may be in a range of between about 0.026 and about 79 atoms/nm$^2$, preferably between about 0.26 and about 66 atoms/nm$^2$.

Higher levels of metal ions than 3.0 wt. % can be applied to glass fibers using these and similar deposition techniques, however at these higher levels the metal ions would increasingly be deposited as oxides and hydroxides, which typically contain less available forms of metal.

Antibiotic and Antiviral Testing

Because the enumeration of viruses requires specialized skills and equipment as well as exceptionally clean environments to conduct this analysis, bacterial surrogates are often used determine general biocidal efficacy of anti-microbial treatments. This is especially true with the use of vegetative gram-negative bacteria and enveloped viruses, which both possess a lipid bilayer cell envelope that is a target for many biocidal agents such as metals and quaternary ammonium compounds. An example of this is Schmidt, Marcel, "Identification of potential bacterial surrogates for validation of thermal inactivation processes of hepatitis A virus." Master's Thesis, University of Tennessee, 2016. It is generally known that these bacterial surrogates are more resistant to biocides than their viral counterparts so that when efficacy of anti-microbial agents are demonstrated against these surrogates, similar or better anti-microbial activity against corresponding enveloped viruses is anticipated. For example, disinfectants that show virucidal activity against human coronavirus within 30 seconds require 1 minute of contact time to demonstrate efficacy against a vegetative gram-negative bacterium such as *Serratia marcescens*. Therefore, the use of bacterial surrogates is a valid approach to ensure biocidal agents are similarly effective against corresponding enveloped viruses.

Compared with the untreated surface of the substrate, the treated substrate is believed to have increased affinity for airborne viral particles.

EXAMPLES

Example I: Copper on C Glass

Glass microfibers C-04-F produced by Unifrax are obtained.

Subsequently, the as-received, non-calcined glass sample undergoes an acid-leach treatment. 15 g of the C glass and 4 L 5.5 wt. % nitric acid are each placed in a 4-L wide-neck plastic container. The plastic container is placed in an air draft oven at 90° C. oven for 2 hours and shaken briefly by hand every 30 minutes. After the acid-leach treatment is completed, the sample is filtered on a Buchner funnel with a 150 mm diameter Whatman 541 paper and washed with about 7.6 L deionized water. Thereafter, the acid-leached sample is dried at 110° C. for 18 hrs.

Second, the acid-leach treated C glass undergoes a metal loading treatment. In this example, copper nitrate is used to prepare 4 L 0.0006 wt. % copper solution with deionized water. About 14 g of acid-leached C glass is added to the metal loading solution ("glass/metal solution mixture") in a 4-L wide-neck plastic container. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.4). The container is placed in an air-draft oven at 50° C. oven for 2 hours and shaken briefly by hand every 30 minutes. After the metal loading treatment is completed, the glass/metal solution mixture is filtered on a Buchner funnel with a 150 mm diameter Whatman 541 paper and the glass sample collected is washed with about 7.6 L of a dilute $NH_4OH$ solution. The dilute $NH_4OH$ solution is prepared by mixing 10 g of a concentrated 29.8 wt. % $NH_4OH$ solution with about 3.8 L of deionized water. Thereafter, the metal-loaded glass sample is dried at 110° C. for 18 hrs.

The sample is analyzed by ICP-AES, resulting in a copper concentration of about 0.080 wt. %.

Another sample made in the same manner is analyzed by ICP-AES, resulting in a copper concentration of about 0.094 wt. %. The virucidal properties of this material against Human Coronavirus strain 229E (ATCC #VR-740) analyzed with ISO 18184:2019(E) show 99.6% reduction after a 4-hour exposure against a control sample (untreated fibers) with 36.9% reduction.

Example II: Silver on C Glass

Glass microfibers C-04-F produced by Unifrax are obtained. Then, the as-received, non-calcined glass sample undergoes an acid-leach treatment. 12 g of the C glass and 4 L 5.5 wt. % nitric acid are each placed in a 4-L wide neck plastic container. The plastic container is placed in an air draft oven at 90° C. oven for 2 hours and shaken briefly by hand every 30 minutes. After the acid-leach treatment is completed, the sample is filtered on a Buchner funnel with a 150 mm diameter Whatman 541 paper and washed with about 7.6 L deionized water. Thereafter, the acid-leached sample is dried at 110° C. for 18 hrs.

Second, the acid-leach treated C glass undergoes a metal loading treatment. In this example, silver nitrate is used to prepare 4 L 0.001 wt. % silver solution with deionized water. About 11 g of acid-leached C glass is added to the metal loading solution ("glass/metal solution mixture") in a wide-neck plastic container. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.4). The container is placed in an air-draft oven at 50° C. oven for 2 hours and shaken briefly by hand every 30 minutes. After the metal loading treatment is completed, the glass/metal solution mixture is filtered on a Buchner funnel with a 150 mm diameter Whatman 541 paper and the glass sample collected is washed with about 7.6 L of a dilute $NH_4OH$ solution. The dilute $NH_4OH$ solution is prepared by mixing 10 g of a concentrated 29.8 wt. % $NH_4OH$ solution with about 3.8 L of deionized water. Thereafter, the metal-loaded glass sample is dried at 110° C. for 18 hrs.

The sample is analyzed by ICP-AES, resulting in a silver concentration of about 0.19 wt. %.

Another sample made in the same manner is analyzed by ICP-AES, resulting in a silver concentration of about 0.15 wt. %. The virucidal properties of this material against Human Coronavirus strain 229E (ATCC #VR-740) analyzed with ISO 18184:2019(E) show 99.4% reduction after a 4-hour exposure against a control sample with 36.9% reduction.

Example III: Copper & Silver on C Glass

Glass microfibers C-04-F produced by Unifrax are obtained. First, the as-received, non-calcined glass sample undergoes an acid-leach treatment. 15 g of the C glass and 4 L 5.5 wt. % nitric acid are each placed in a 4-L wide neck plastic container. The plastic container is placed in an air draft oven at 90° C. oven for 2 hours and shaken briefly by hand every 30 minutes. After the acid-leach treatment is completed, the sample is filtered on a Buchner funnel with a 150 mm diameter Whatman 541 paper and washed with about 7.6 L deionized water. Thereafter, the acid-leached sample is dried at 110° C. for 18 hrs.

Second, the acid-leach treated C glass undergoes a metal loading treatment. In this example, 4 L 0.0016 wt. % total metal solution in deionized water is used. The metal loading solution is prepared by mixing 2 L 0.001 wt. % silver solution and 2 L 0.0006 wt. % copper solution. In this example, silver nitrate is used to prepare 2 L 0.001 wt. % M1 solution and copper nitrate is used to prepare 2 L 0.0006 wt. % M2 solution. About 13 g of acid-leached C glass is added to the metal loading solution ("glass/metal solution mixture") in a wide-neck plastic container. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.4). The container is placed in an air-draft oven at 50° C. oven for 2 hours and shaken briefly by hand every 30 minutes. After the metal loading treatment is completed, the glass/metal solution mixture is filtered on a Buchner funnel with a 150 mm diameter Whatman 541 paper and the glass sample collected is washed with about 7.6 L of a dilute $NH_4OH$ solution. The dilute $NH_4OH$ solution is prepared by mixing 10 g of a concentrated 29.8 wt. % $NH_4OH$ solution with about 3.8 L of deionized water. Thereafter, the metal-loaded glass sample is dried at 110° C. for 18 hrs.

The sample is analyzed by ICP-AES, resulting in a silver concentration of about 0.15 wt. % and a copper concentration of about 0.05 wt. %.

The virucidal properties of this material against Human Coronavirus strain 229E (ATCC #VR-740) analyzed with ISO 18184:2019(E) show 99.8% reduction after a 4-hour exposure against a control sample with 36.9% reduction.

Example IV: Zinc on C Glass

Glass microfibers C-04-F produced by Unifrax are obtained. First, the as-received, non-calcined glass sample undergoes an acid-leach treatment. 15 g of the C glass and 4 L 5.5 wt. % nitric acid are each placed in a 4-L wide-neck plastic container. The plastic container is placed in an air draft oven at 90° C. oven for 2 hours and shaken briefly by hand every 30 minutes. After the acid-leach treatment is completed, the sample is filtered on a Buchner funnel with a 150 mm diameter Whatman 541 paper and washed with about 7.6 L deionized water. Thereafter, the acid-leached sample is dried at 110° C. for 18 hrs.

Second, the acid-leach treated C glass undergoes a metal loading treatment. In this example, zinc nitrate hexahydrate is used to prepare 4 L 0.0005 wt. % zinc solution with deionized water. About 14 g of acid-leached C glass is added to the metal loading solution ("glass/metal solution mixture") in a 4-L wide-neck plastic container. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.2). The container is placed in an air-draft oven at 50° C. oven for 2 hours and shaken briefly by hand every 30 minutes. After the metal loading treatment is completed, the glass/metal solution mixture is filtered on a Buchner funnel with a 150 mm diameter Whatman 541 paper and the glass sample collected is washed with about 7.6 L of a dilute $NH_4OH$ solution. The dilute $NH_4OH$ solution is prepared by mixing 10 g of a concentrated 29.8 wt. % $NH_4OH$ solution with about 3.8 L of deionized water. Thereafter, the metal-loaded glass sample is dried at 110° C. for 18 hrs.

The sample is analyzed by ICP-AES, resulting in a zinc concentration of about 0.14 wt. %.

The virucidal properties of this material against Human Coronavirus strain 229E (ATCC #VR-740) analyzed with ISO 18184:2019(E) show 99.5% reduction after a 4-hour exposure against a control sample with 36.9% reduction.

Example V: Copper on B Glass

Glass microfibers B-04-F produced by Unifrax are obtained. The B glass undergoes a metal loading treatment. In this example, copper (II) sulfate pentahydrate is used to prepare 1.2 L 0.025 wt. % copper solution with tap water. About 12 g of shredded B glass is added to the metal loading solution ("glass/metal solution mixture") in a 2 L plastic beaker. The pH of the glass/metal solution mixture is measured. As needed, the pH of the mixture is adjusted by adding 0.1 M NaOH (~30 ml, in this example, resulting in pH of about 5.7). The glass/metal solution mixture is then stirred for 15 minutes at room temperature using an overhead mixer and a round shaped steel impeller. After the metal loading treatment is completed, the glass/metal solution mixture is filtered on a Buchner funnel with a 150 mm diameter Whatman 541 paper. Thereafter, the metal-loaded glass sample is dried at 100° C. for 3 hrs.

The sample is analyzed by ICP-AES, resulting in a copper concentration of about 2.02 wt. %.

Example VI: Zinc on B Glass

Glass microfibers B-04-F produced by Unifrax are obtained. The B glass undergoes a metal loading treatment. In this example, zinc sulfate heptahydrate is used to prepare 1.2 L 0.0191 wt. % zinc solution with tap water. About 12 g of shredded B glass is added to the metal loading solution ("glass/metal solution mixture") in a 2-L plastic beaker. The pH of the glass/metal solution mixture is measured. As needed, the pH of the mixture is adjusted by adding 0.1 M NaOH (~40 ml, in this example, resulting in a pH of about 8). The glass/metal solution mixture is then stirred for 15 minutes at room temperature using an overhead mixer and a round shaped steel impeller. After the metal loading treatment is completed, the glass/metal solution mixture is filtered on a Buchner funnel with a 150 mm diameter Whatman 541 paper. Thereafter, the metal-loaded glass sample is dried at 1100° C. for 3 hrs.

The sample is analyzed by ICP-AES, resulting in a net zinc concentration increase of about 2.0 wt. %.

Example IX: Zinc on B Glass

Glass microfibers B-04-F produced by Unifrax are obtained. The B glass undergoes a metal loading treatment. In this example, zinc nitrate hexahydrate is used to prepare 1.867 L 0.00244 wt. % zinc solution with deionized water. About 7 g of shredded B glass is added to the metal loading solution ("glass/metal solution mixture") in a 2-L plastic beaker. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.3). The glass/metal solution mixture is then stirred for 30 minutes at room temperature using an overhead mixer and a round shaped steel impeller. After the metal loading treatment is completed, the glass/metal solution mixture is filtered on a Buchner funnel with a 150 mm diameter Whatman 541 paper and washed with about 3.547 L of deionized water. Thereafter, the metal-loaded glass sample is dried in an air draft over at 110° C. for 18 hrs.

The sample is analyzed by ICP-AES, resulting in a net zinc concentration increase of about 0.58 wt. %.

The virucidal properties of this material against Human Coronavirus strain 229E (ATCC #VR-740) analyzed with ISO 18184:2019(E) show 99.5% reduction after a 4-hour exposure against a control sample with 0% reduction.

Example X: Zinc on B Glass

Glass microfibers B-04-F produced by Unifrax are obtained. The B glass undergoes a metal loading treatment. In this example, zinc nitrate hexahydrate is used to prepare 800 mL 0.00375 wt. % zinc solution with deionized water. About 3 g of shredded B glass is added to the metal loading solution ("glass/metal solution mixture") in a 1-L plastic bottle. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.2). The container is placed under the hood for 30 min at room temperature and shaken briefly by hand occasionally. After the metal loading treatment is completed, the glass/metal solution mixture is filtered on a Buchner funnel with a 150 mm diameter Whatman 541 paper and washed with about 1.52 L of deionized water. Thereafter, the metal-loaded glass sample is dried in an air draft oven at 110° C. for 18 hrs.

The sample is analyzed by ICP-AES, resulting in a net zinc concentration increase of about 0.93 wt. %.

The virucidal properties of this material against Human Coronavirus strain 229E (ATCC #VR-740) analyzed with ISO 18184:2019(E) show 99.6% reduction after a 4-hour exposure against a control sample with 0% reduction.

Example XI: Copper on B Glass

Glass microfibers B-04-F produced by Unifrax are obtained. The B glass undergoes a metal loading treatment. In this example, copper (II) nitrate hemipentahydrate is used to prepare 1.867 L 0.00244 wt. % copper solution with deionized water. About 7 g of shredded B glass is added to the metal loading solution ("glass/metal solution mixture") in a 2-L plastic beaker. The pH of the glass/metal solution mixture is measured. As needed, the pH of the mixture is adjusted with a continuous drop-wise addition of about 29.8 wt. % ammonium hydroxide ($NH_4OH$) to greater than pH 10 (in this example, resulting in a pH of about 10.2). The glass/metal solution mixture is then stirred for 30 minutes at room temperature using an overhead mixer and a round shaped steel impeller. After the metal loading treatment is completed, the glass/metal solution mixture is filtered on a Buchner funnel with a 150 mm diameter Whatman 541 paper and washed with about 3.547 L of deionized water. Thereafter, the metal-loaded glass sample is dried in an air draft over at 110° C. for 18 hrs.

The sample is analyzed by ICP-AES, resulting in a copper concentration of about 0.57 wt. %.

The virucidal properties of this material against Human Coronavirus strain 229E (ATCC #VR-740) analyzed with ISO 18184:2019(E) show 99.8% reduction after a 4-hour exposure against a control sample with 0% reduction.

Example XII. SARS-CoV-2 and H1N1 Testing

A Zn treated glass was made in a procedure similar to Example IX, except with a lower Zn target and pH adjustment to 9. The resulting fiber had an ICP determined Zn level of 0.2 wt. %.

An ISO 1848 test of antiviral activity using SARS-CoV-2 virus gave 98.4% reduction against the control sample. An ISO1848 test of antiviral activity using Influenza A Virus (H1N1) gave 98.1% reduction against the control sample.

The Cu treated glass of Example XI was evaluated in the same tests and gave 99.7% and 98.5% reduction against controls for SARS-CoV-2 and Influenza A Virus (H1N1) respectively.

Airborne Particle Affinity Testing

A filter having media that was treated with zinc similar in relative proportions to Example X, but carried out in the pulper of a pilot paper machine, with pH adjustment of 8-9 using a NaOH solution, gave an average added Zn2+ quantity of 0.82 wt. % and a filter with untreated media were used to fabricate two filters, each measuring 24×24×2". Both the treated and untreated filter media included a mixture of differently sized fibers. The untreated filter media was a glass microfiber MERV 13 HVAC filter made under substantially similar manufacturing conditions as the treated filter media. The filters were fabricated by pleating the treated and untreated filter media and gluing both of the pleated filter media into beverage board frames to allow mounting in ASHRAE test duct. For single-pass efficiency testing, aerosolized MS-2 bacteriophage (ATCC 15597-B1) was used as the test aerosol organism.

Single Pass Efficiency Testing: Organisms were grown on appropriate media, harvested, and resuspended in saline to 5×10E7 pfu/ml. Suspensions of the organisms were then aerosolized into the test duct using a nebulizer. While the test aerosol was injected into the test duct, both upstream and downstream air samples were taken using SKC Bio-Stage Impactor calibrated to 28.3 L/M. The collection plates, having a double layer of agar consisting of a hard Lysogeny broth (LB) bottom layer and a soft top layer incorporating *E. coli*, were then incubated at 35° C. (95° F.) and 96% relative humidity for 24 hours. After incubation, the recovered plaque-forming units (PFU) were enumerated. Only PFUs 1.0 mm or larger were counted. The efficiency was calculated using the formula:

Removal Efficiency=1−(FilterPFUdownstream FilterPFUupstream*EmptyPFUupstream EmptyPFUdownstream) [EQ.1].

Test Conditions and Apparatus

The single-pass efficiency tests were conducted in a 24×24 ASHRAE duct. The test system airflow was run at 1000 cfm. Horizontal stainless-steel test duct constructed per ASHRAE Standard 52.2-2017, Method of Testing General Ventilation Air-Cleaning Devices for Removal Efficiency by Particle Size. See, Zhang, et al. “Study of Viral Filtration Performance of Residential HVAC Filters,” FIG. 1, ASHRAE Journal (August 2020).

Viral reductions occurring in the test apparatus without the presence of filters were recorded up and downstream from filter mount. The data from the tests is shown in the below TABLES.

TABLE 2

| | MS-2 Hole Corrected Pfu on Treated Media | | | |
|---|---|---|---|---|
| Run | Test Upstream | Test Downstream | Nat Decay-upstream | Nat Decay-Downstream |
| 1 | 839.9 | 104.6 | 772.4 | 703 |
| 2 | 624.2 | 125.9 | 772.4 | 703 |
| 3 | 531.2 | 83 | 772.4 | 703 |

TABLE 3

| | Treated Media | | |
|---|---|---|---|
| Run | Hole Corrected Upstream Count | Hole Corrected Downstream Count | Removal Efficiency % |
| 1 | 839.9 | 104.6 | 86.3 |
| 2 | 624.2 | 125.9 | 77.8 |
| 3 | 531.2 | 83.0 | 82.8 |

TABLE 4

| | MS-2 Hole Corrected Pfu on Untreated Media | | | |
|---|---|---|---|---|
| Run | Test Upstream | Test Downstream | Nat Decay-Upstream | Nat Decay-Downstream |
| 1 | 315 | 197.7 | 772.4 | 703 |
| 2 | 308.4 | 192.8 | 772.4 | 703 |
| 3 | 135.6 | 80.6 | 772.4 | 703 |

TABLE 5

| | Untreated Media | | |
|---|---|---|---|
| Run | Hole Corrected Upstream Count | Hole Corrected Downstream Count | Removal Efficiency % |
| 1 | 315.0 | 197.7 | 31.0 |
| 2 | 308.4 | 192.8 | 31.3 |
| 3 | 135.6 | 80.6 | 34.7 |

As can be seen from the above, the results indicated filter made from the untreated filter media had removal efficiency between 31.0 to 34.7%. In contrast, the filter made with a filter media that was treated to increase a loading of divalent metals showed a removal efficiency of at least 77% and up to 86%. After completion of the foregoing experiments, it was thought that the results with the untreated filter media may be unreliable due to experimental conditions.

Accordingly, another similar experiment was conducted and the following data were collected:

TABLE 6

| Run # | | Test upstream | Test Downstream | Removal Efficiency % |
|---|---|---|---|---|
| 1 | Treated | 1447 | 58 | 95.8% |
| | Untreated | 341 | 91 | 72.4% |
| 2 | Treated | 530 | 25 | 95.1% |
| | Untreated | 375 | 71 | 80.4% |
| 3 | Treated | 401 | 37 | 90.5% |
| | Untreated | 401 | 57 | 85.3% |

As can be seen from the above, the filter made from the untreated filter media had and average removal efficiency of 79.4%. In contrast, the filter made with a filter media that was treated to increase a loading of divalent metals showed an average removal efficiency of 93.8%.

Multi-pass Efficiency Testing: Multi-pass efficiency testing was carried out with MS-2 bacteriophage (ATCC 15597-B1) as the challenge aerosols. Testing was performed in a large (4000 $ft^3$) stainless-steel chamber with wrap around test duct.

In these tests, the MS-2 bacteriophage was harvested and titrated to $10E^9$ pfu/ml. Suspensions of the organisms were then aerosolized into the chamber using a nebulizer prior to powering the test device. The test chamber air was sampled at 10-minute intervals using a SKC Bio-Stage cascade impactor for 1-minute sampling periods as the chamber air was circulated through the wrap around test duct containing the test filters. The cascade impactors were calibrated to an airflow rate of 28.3 liters/min and the sampling inlet was situated at the off. Midpoint of the test chambers. The recovered organisms were enumerated after 24-hours of incubation. The circulation times and associated removal efficiencies are given in the tables below.

The corrected removal efficiencies for the air cleaner uses the empty chamber data from time=0 as follows:

$$\text{Corrected Removal Efficiency} = 1 - \left(\frac{DevicePFU_{t=x}}{DevicePFU_{t=0}} * \frac{EmptyPFU_{t=0}}{EmptyPFU_{t=x}}\right) \quad \text{[EQ. 2]}$$

The average removal efficiencies for triplicate experiments with treated and untreated three filters at various circulation times were determined to be:

TABLE 7

| Run | | Time 30 | Time 60 |
|---|---|---|---|
| Treated | Efficiency % | 68.9 | 97.5 |
| Untreated | Efficiency % | 52.3 | 96.4 |

As can be seen from the above data in TABLE 7, the treated filter removed the viral aerosol more rapidly from the chamber than the untreated filter, as indicated by the 62.43% removal at 30 minutes by the treated filter and 47.93% removal after 30 minutes by the untreated filter.

In a similar experiment, the filters were preloaded with dust prior to the viral aerosol removal tests. The removal efficiency efficiencies for the viral aerosol at various circulation times were determined to be:

TABLE 8

Treated filter

| | Time 0 | 5 | 10 | 15 | 20 | 25 | 30 | 45 | 60 |
|---|---|---|---|---|---|---|---|---|---|
| Efficiency % | 0 | 46.23 | 80.42 | 89.33 | 92.59 | 94.56 | 97.27 | 99.32 | 99.96 |

TABLE 9

Untreated filter

| | Time 0 | 5 | 10 | 15 | 20 | 25 | 30 | 45 | 60 |
|---|---|---|---|---|---|---|---|---|---|
| Efficiency % | 0 | 6.71 | 55.12 | 71.8 | 79.64 | 84.36 | 91.28 | 96.41 | 98.68 |

The viral aerosol removal efficiency for the treated, dust-loaded filter reached relatively high values significantly faster than the untreated, dust-loaded filter in this experiment, even as early as 5 minutes circulation through the filter.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a fiber substrate, the process comprising providing the fiber substrate, wherein the fiber substrate comprises fiberglass; introducing the fiber substrate to a salt solution, wherein the salt solution comprises divalent metal cations, trivalent metal cations, or a combination thereof; depositing the metal cations onto the fiber substrate; and drying the fiber substrate, after the metal cations have been deposited, wherein the divalent and trivalent metal cations are selected from a group consisting of Mn2+, Co2+, Co3+, Ga3+, Al3+, Mg2+, Ca2+, Sr2+, Ba2+, La3+, Bi3+, Ce3+, Pr3+, Nd3+, Pm3+, Sm3+, Eu3+, Gd3+, Tb3+, Dy3+, Ho3+, Er3+, Tm3+, Yb3+, Lu3+. An embodiment of the invention is one, any or all of prior embodiments in this paragraph up through the first embodiment in this paragraph, wherein the divalent and trivalent metal cations are selected from a group consisting of Mn2+, Co2+, Co3+, Ga3+, Al3+, Mg2+, Ca2+, Sr2+, and Ba2+. An embodiment of the invention is one, any or all of prior embodiments in this paragraph up through the first embodiment in this paragraph, wherein the divalent and trivalent metal cations are deposited by ion exchange. An embodiment of the invention is one, any or all of prior embodiments in this paragraph up through the first embodiment in this paragraph, wherein the ion exchange occurs with a proton on the fiber substrate. An embodiment of the invention is one, any or all of prior embodiments in this paragraph up through the first embodiment in this paragraph, wherein the ion exchange occurs with a monovalent metal cation on the fiber substrate. An embodiment of the invention is one, any or all of prior embodiments in this paragraph up through the first embodiment in this paragraph, wherein the divalent and trivalent metal cations are deposited by entangling in the fiber substrate. An embodiment of the invention is one, any or all of prior embodiments in this paragraph up through the first embodiment in this paragraph, further comprising increasing an amount of SiOH species on the glass fibers. An embodiment of the invention is one, any or all of prior embodiments in this paragraph up through the first embodiment in this paragraph, wherein the amount of SiOH is increased by an acid leaching. An embodiment of the invention is one, any or all of prior embodiments in this paragraph up through the first embodiment in this paragraph, wherein the acid leaching occurs before introducing the fiber substrate to the salt solution. An embodiment of the invention is one, any or all of prior embodiments in this paragraph up through the first embodiment in this paragraph, wherein the acid leaching occurs simultaneously with introducing the fiber substrate to the salt solution. An embodiment of the invention is one, any or all of prior embodiments in this paragraph up through the first embodiment in this paragraph, wherein the amount of the divalent and trivalent metal cations on the fiber substrate is increased is at least 0.001 wt % of the fiber substrate. An embodiment of the invention is one, any or all of prior embodiments in this paragraph up through the first embodiment in this paragraph, wherein the amount of the divalent and trivalent metal cations on the fiber substrate is at least 0.005 wt % of the fiber substrate. An embodiment of the invention is one, any or all of prior embodiments in this paragraph up through the first embodiment in this paragraph, wherein the amount of the divalent and trivalent metal cations on the fiber substrate is between 0.001 and 3.0 wt % of the fiber substrate.

A second embodiment of the invention is a filter media substrate comprising fiberglass, wherein the fiberglass has been treated to increase an amount of divalent cations, trivalent cations, or both at least 0.001 wt %, wherein the divalent and trivalent metal cations are selected from a group consisting of Mn2+, Co2+, Co3+, Ga3+, Al3+, Mg2+, Ca2+, Sr2+, Ba2+, Bi3+, La3+, Ce3+, Pr3+, Nd3+, Pm3+, Sm3+, Eu3+, Gd3+, Tb3+, Dy3+, Ho3+, Er3+, Tm3+, Yb3+, Lu3+. An embodiment of the invention is one, any or all of prior embodiments in this paragraph up through the second embodiment in this paragraph, wherein the divalent and trivalent metal cations are selected from a group consisting of Mn2+, Co2+, Co3+, Ga3+, Al3+, Mg2+, Ca2+, Sr2+, and Ba2+. An embodiment of the invention is one, any or all of prior embodiments in this paragraph up through the second embodiment in this paragraph, wherein the divalent and trivalent metal cations comprise between about 0.005 and about 3.0 wt. % of the filter media substrate. An embodiment of the invention is one, any or all of prior embodiments in this paragraph up through the second embodiment in this paragraph, wherein the divalent and trivalent metal cations comprise between 0.01 and 3.0 wt. % of the filter media substrate. An embodiment of the invention is one, any or all of prior embodiments in this paragraph up through the second embodiment in this paragraph, wherein the divalent and trivalent metal cations comprise between 0.05 and 3.0 wt. % of the filter media substrate. An embodiment of the invention is one, any or all of prior embodiments in this paragraph up through the second embodiment in this paragraph, wherein the divalent and trivalent metal cations comprise between 0.1 and 3.0 wt. % of the filter media substrate. An embodiment of the invention is one, any or all of prior embodiments in this paragraph up through the second embodiment in this paragraph, wherein the divalent and trivalent metal cations comprise between 0.15 and 3.0 wt. % of the filter media substrate.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for treating a fiber substrate, the process comprising:

providing the fiber substrate, wherein the fiber substrate comprises glass fibers;

introducing the fiber substrate to a salt solution, wherein the salt solution comprises divalent metal cations, trivalent metal cations, or a combination thereof;

depositing the metal cations onto the fiber substrate; and drying the fiber substrate, after the metal cations have been deposited, wherein the divalent and trivalent metal cations are selected from a group consisting of: Mn2+, Co2+, Co3+, Ga3+, Al3+, Mg2+, Ca2+, Sr2+, Ba2+, La3+, Bi3+, Ce3+, Pr3+, Nd3+, Pm3+, Sm3+, Eu3+, Gd3+, Tb3+, Dy3+, Ho3+, Er3+, Tm3+, Yb3+, and Lu3+, wherein the divalent and trivalent metal cations are deposited by entangling in the fiber substrate, wherein an amount of the divalent and trivalent metal cations on the fiber substrate is increased by at least 0.001 wt % of the fiber subtrate.

2. The process of claim 1, wherein the divalent and trivalent metal cations are selected from a group consisting of: Mn2+, Co2+, Co3+, Ga3+, Al3+, Mg2+, Ca2+, Sr2+, and Ba2+.

3. The process of claim 1, further comprising: increasing an amount of SiOH species on the glass fibers.

4. The process of claim 3, wherein the amount of SiOH is increased by an acid leaching.

5. The process of claim 4, wherein the acid leaching occurs before introducing the fiber substrate to the salt solution.

6. The process of claim 4, wherein the acid leaching occurs simultaneously with introducing the fiber substrate to the salt solution.

7. The process of claim 1, wherein an amount of the divalent and trivalent metal cations on the fiber substrate is at least 0.005 wt % of the fiber substrate.

8. The process of claim 1, wherein an amount of the divalent and trivalent metal cations on the fiber substrate is between 0.001 and 3.0 wt % of the fiber substrate.

9. A filter media substrate comprising:

fiberglass, wherein the fiberglass has been treated to increase an amount of divalent metal cations, trivalent metal cations, or both by at least 0.001 wt %, wherein the divalent and trivalent metal cations are selected from a group consisting of: Mn2+, Co2+, Co3+, Ga3+, Al3+, Mg2+, Ca2+, Sr2+, Ba2+, Bi3+, La3+, Ce3+, Pr3+, Nd3+, Pm3+, Sm3+, Eu3+, Gd3+, Tb3+, Dy3+, Ho3+, Er3+, Tm3+, Yb3+, Lu3+, wherein the divalent and trivalent metal cations are deposited on the fiberglass by entangling in the fiberglass.

10. The filter media substrate of claim 9, wherein the divalent and trivalent metal cations are selected from a group consisting of: Mn2+, Co2+, Co3+, Ga3+, Al3+, Mg2+, Ca2+, Sr2+, and Ba2+.

11. The filter media substrate of claim 9, wherein the divalent and trivalent metal cations comprise between about 0.005 and about 3.0 wt. % of the filter media substrate.

12. The filter media substrate of claim 9, wherein the divalent and trivalent metal cations comprise between 0.01 and 3.0 wt. % of the filter media substrate.

13. The filter media substrate of claim 9, wherein the divalent and trivalent metal cations comprise between 0.05 and 3.0 wt. % of the filter media substrate.

14. The filter media substrate of claim 9, wherein the divalent and trivalent metal cations comprise between 0.1 and 3.0 wt. % of the filter media substrate.

15. The filter media substrate of claim 9, wherein the divalent and trivalent metal cations comprise between 0.15 and 3.0 wt. % of the filter media substrate.

16. A process for treating a fiber substrate, the process comprising:

providing the fiber substrate, wherein the fiber substrate comprises glass fibers;

introducing the fiber substrate to a salt solution, wherein the salt solution comprises divalent metal cations, trivalent metal cations, or a combination thereof;

depositing the metal cations onto the fiber substrate; and drying the fiber substrate, after the metal cations have been deposited, increasing an amount of SiOH species on the glass fibers, wherein the divalent and trivalent metal cations are selected from a group consisting of: $Mn^{2+}$, $Co^{2+}$, $Co^{3+}$, $Ga^{3+}$, $Al^{3+}$, $Mg^{2+}$, $Ca^{2+}$, $Sr^{2+}$, $Ba^{2+}$, $La^{3+}$, $Bi^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$, wherein the amount of SiOH is increased by an acid leaching, wherein the acid leaching occurs simultaneously with introducing the fiber substrate to the salt solution.

* * * * *